United States Patent
Guibbert et al.

(10) Patent No.: US 9,640,006 B2
(45) Date of Patent: May 2, 2017

(54) METHOD FOR DETECTING THE ACTUATION OF A MOTOR VEHICLE DOOR HANDLE

(71) Applicants: CONTINENTAL AUTOMOTIVE FRANCE, Toulouse (FR); CONTINENTAL AUTOMOTIVE GmbH, Hannover (DE)

(72) Inventors: Mickael Guibbert, Toulouse (FR); Olivier Elie, Toulouse (FR); Olivier Gerardiere, Tournefeuille (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/844,671

(22) Filed: Sep. 3, 2015

(65) Prior Publication Data

US 2016/0078701 A1    Mar. 17, 2016

(30) Foreign Application Priority Data

Sep. 11, 2014 (FR) ...................... 14 58530

(51) Int. Cl.
*B60R 25/00* (2013.01)
*G05B 19/00* (2006.01)
(Continued)

(52) U.S. Cl.
CPC ........ *G07C 9/00126* (2013.01); *B60R 25/246* (2013.01)

(58) Field of Classification Search
CPC .................................. G07C 9/00126
(Continued)

(56) References Cited

U.S. PATENT DOCUMENTS

| 2004/0075531 A1 | 4/2004 | Ieda et al. |
| 2006/0055510 A1* | 3/2006 | Little ............... E05B 81/78 340/5.62 |

(Continued)

FOREIGN PATENT DOCUMENTS

| DE | 103 28 332 A1 | 2/2004 |
| DE | 10 2005 055888 A1 | 11/2007 |

(Continued)

OTHER PUBLICATIONS

FR Search Report, dated Jun. 3, 2015, from corresponding FR application.

*Primary Examiner* — Qutbuddin Ghulamali
(74) *Attorney, Agent, or Firm* — Young & Thompson

(57) ABSTRACT

A method for detecting the actuation of a handle (10) of a motor vehicle door (20), the handle (10) including at least a locking electrode (60), having a capacitance across its terminals, and an unlocking request detection device (50) generating an unlocking request signal, the method including continuously measuring a variation of the unlocking request signal and a variation of the capacitance ($\Delta C_V$) of the locking electrode, determining an unlocking request, and then comparing the variation of the capacitance ($\Delta C_V$) with a threshold (S2) during consecutive first and second predetermined periods (t1, t2), respectively, in order to detect whether the handle (10) has been actuated.

19 Claims, 5 Drawing Sheets

(51) Int. Cl.
*G07C 9/00* (2006.01)
*B60R 25/24* (2013.01)

(58) Field of Classification Search
USPC ............... 340/5.72, 5.62, 5.61; 307/104
See application file for complete search history.

(56) References Cited

U.S. PATENT DOCUMENTS

| | | |
|---|---|---|
| 2007/0096905 A1 | 5/2007 | Ieda et al. |
| 2007/0146120 A1* | 6/2007 | Kachouh ............... B60R 25/245 340/5.72 |
| 2008/0061933 A1 | 3/2008 | Ieda et al. |
| 2009/0153296 A1* | 6/2009 | LeGasse ............... B60R 25/246 340/5.72 |
| 2011/0260831 A1 | 10/2011 | Ieda et al. |
| 2013/0271071 A1 | 10/2013 | Cheikh et al. |
| 2014/0172336 A1 | 6/2014 | Hourne |
| 2016/0236652 A1* | 8/2016 | Miyazawa ............... B60R 25/24 |

FOREIGN PATENT DOCUMENTS

| | | |
|---|---|---|
| EP | 1 760 227 A1 | 3/2007 |
| FR | 2 905 716 A1 | 3/2008 |
| FR | 2 989 529 A1 | 10/2013 |
| FR | 2 999 833 A1 | 6/2014 |
| FR | 3 003 411 A1 | 9/2014 |
| WO | 2005/041130 A2 | 5/2005 |
| WO | 2010/082448 A1 | 7/2010 |

* cited by examiner

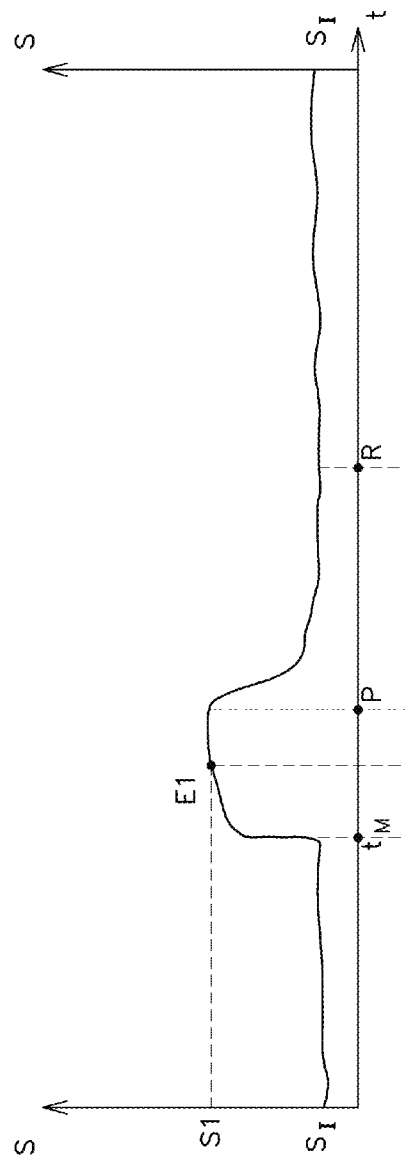
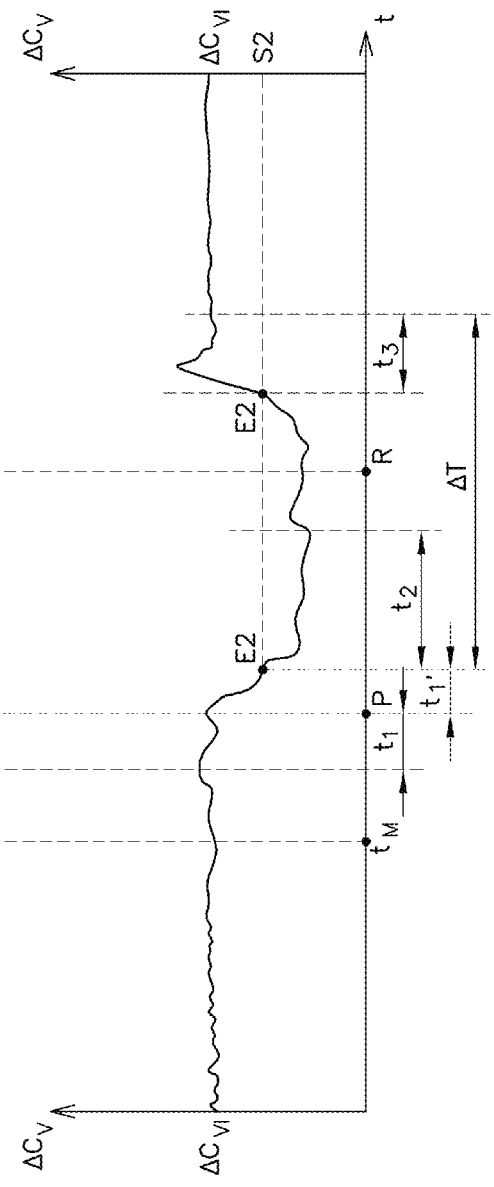
Fig 5
Fig 5a
Fig 5b

METHOD FOR DETECTING THE ACTUATION OF A MOTOR VEHICLE DOOR HANDLE

FIELD OF THE INVENTION

The invention relates to a method for detecting the actuation of a motor vehicle door handle.

BACKGROUND OF THE INVENTION

The term "actuation" denotes the action of a user placing his hand on the handle and pulling it so as to open the door and enter the vehicle.

The detection of the actuation of the door handle, or "handle pulled" detection, is used, for certain types of vehicle, in order to adapt the passenger compartment (by adjusting the seat position or steering wheel position, or personalizing the radio or the dashboard color, for example) on the basis of the "hands-free" access badge (and thus on the basis of the user) previously identified by the vehicle. In some applications it can also be used to activate certain functions such as the "low power" mode of the "hands-free" access system. This is because, if a number of approaches of the user's hand are detected by a presence detection device integrated into the handle, but the handle is not actuated (that is to say, pulled) following these detections, then these detections are "false" detections, due to the impact of rain on the handle for example, and the "hands-free" access system is then put into the "low power" mode which disables the search for the "hands-free" access badge, to avoid unnecessarily discharging the vehicle battery.

As shown in FIG. 1, at the present time a handle 10 of a vehicle door 20 comprises:
  an approach and/or contact detection sensor 30 in the form of a capacitive sensor, connected to a locking electrode 60 for locking the vehicle, that is to say a flat conductive metal piece which is oriented toward the outside of the vehicle, and which, in FIG. 1, is located perpendicularly to an axis Z, which is the axis of rotation of the handle 10,
  an unlocking presence detection device 50, for the purpose of unlocking the vehicle, in the form of an unlocking electrode, oriented toward the door 20 of the vehicle, or in the form of an optical emitter, a piezoelectric cell, an inductive sensor or a mechanical microswitch, these various devices being suitable for the detection of the approach of a hand to the unlocking area of the handle, or the contact of a hand therewith,
  a Hall effect sensor 9,
  a microcontroller 40, in the form of a printed circuit, connected to the approach detection sensor 30, to the unlocking presence detection device 50, and to the Hall effect sensor 9.

These elements are generally contained in a sealed casing B.

The detection of the actuation of the handle 10 of the door 20 is generally performed by a dedicated system, comprising a magnet 8 and the Hall effect sensor 9. The magnet 8 is located on the fixed part of the handle 10, called the counter-grip 11, and the Hall effect sensor 9 is located facing the magnet 8 in the moving part, in the handle 10 itself. The Hall effect sensor 9 measures the strength of the magnetic field induced by the presence of the magnet 8. The magnetic field strength is high when the handle 10 is in the rest position (see FIG. 1) and the Hall effect sensor 9 is facing the magnet 8. The magnetic field strength is low when the handle 10 is actuated (see FIG. 2), that is to say when the user pulls the handle 10, and the Hall effect sensor 9 is remote from the magnet 8. The variation of the magnetic field strength therefore enables the actuation of the handle 10 to be detected.

However, there are many drawbacks of this dedicated system for detecting the actuation of the handle 10, as follows:
  its high cost;
  constraints associated with the overall dimensions and positioning of the magnet 8 and the Hall effect sensor 9; and
  its power consumption.

SUMMARY OF THE INVENTION

The present invention proposes to detect the actuation of the handle 10 of the door 20 without the use of a dedicated system comprising, for example, a magnet 8 and the Hall effect sensor 9 as described above.

The present invention proposes a method for detecting the actuation of a motor vehicle door handle, said handle comprising:
  an unlocking presence detection device, generating an unlocking request signal,
  a locking electrode, having a capacitance across its terminals,
  an approach detection sensor connected electrically to the locking electrode, and
  a microcontroller connected electrically to the approach detection sensor and to the presence detection device,
said method comprising the following steps:
  Step 1: continuously measuring the unlocking request signal and the variation of the first capacitance,
  Step 2: if, during a first predetermined period, the unlocking request signal is representative of an unlocking request, and if, during a second predetermined period, following the first predetermined period, the variation of the capacitance is below a threshold,
  Step 3: detection of the actuation of the handle is validated, otherwise
  Step 4: repetition of steps 1 to 3.

The method for detecting the actuation of the handle according to the invention is based on the use of the unlocking request signal of the unlocking presence detection device and on the use of the variation of capacitance across the terminals of the locking electrode present in the handle and the timing of said variations.

In a first embodiment of the invention, the detection method comprises, between step 2 and step 3, the following steps:
  Step 2b: and if, during a third predetermined period following the second predetermined period, the variation of the capacitance is above the threshold.

In a second embodiment of the invention, the detection method comprises, between step 2 and step 3, the following steps:
  Step 2b': and if, during a third predetermined period following the second predetermined period, the variation of the capacitance is above the threshold, and the second predetermined period and the third predetermined period are included within a predetermined time interval.

For example, the first predetermined period is equal to 30 ms and the second predetermined period is equal to 100 ms, the third predetermined period is equal to 30 ms, and the predetermined time interval is in the range from 200 ms to 1000 ms.

In a preferred embodiment of the detection method according to the invention, the second predetermined period starts within a predetermined duration after the first predetermined period has elapsed, in the range from 30 ms to 500 ms.

In a preferred embodiment of the detection method according to the invention, the unlocking presence detection device comprises an unlocking electrode which has a second capacitance across its terminals and is connected electrically to the approach detection sensor, in which preferred embodiment:

In Step 1, the continuous measurement of the unlocking request signal consists in the continuous measurement of the variation of the second capacitance, In Step 2, the unlocking request signal representative of an unlocking request consists in the rise of the variation of the second capacitance above a second threshold.

The invention is equally applicable to any motor vehicle characterized by the use of the detection method according to the characteristics listed above.

BRIEF DESCRIPTION OF THE DRAWINGS

Other characteristics and advantages of the invention will be evident from a reading of the following description and from an examination of the appended drawings, in which:

FIG. 5 shows schematically, according to the invention, the unlocking request signal (FIG. 5b) and the variation of the capacitance of the locking electrode (FIG. 5a) when the handle is actuated.

DETAILED DESCRIPTION OF THE INVENTION

The method for detecting the actuation of the handle 10 according to the invention is based on the use of the unlocking request signal of the unlocking presence detection device 50 and on the use of the variation of capacitance across the terminals of the locking electrode 60 which are integrated into the handle 10 when the handle is actuated. According to the invention, the decrease of the variation of the capacitance of the locking electrode below a threshold following the detection of an unlocking request by means of the unlocking request signal signifies the actuation of the handle 10.

Figure 6:
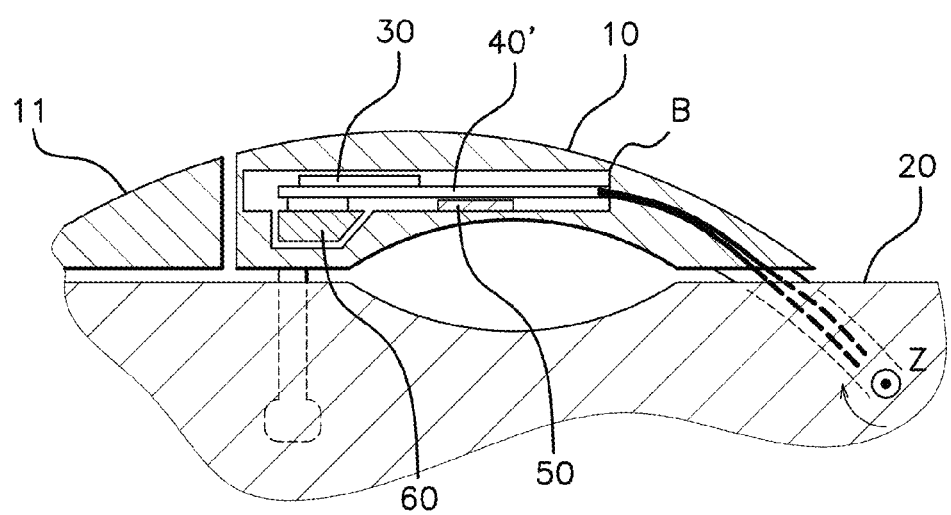
FIG. 6 shows a motor vehicle door handle according to the invention.

According to the invention, the handle 10 comprises an unlocking presence detection device 50 A and a locking electrode 60 connected electrically to an approach detection sensor 30, in the form of a capacitive sensor connected to a microcontroller 40 as shown in FIG. 6. Said unlocking presence detection device 50 and the approach detection sensor 30 are both connected to a microcontroller 40.

The unlocking presence detection device 50 may be, for example:

an unlocking electrode, oriented toward the door 20 of the vehicle, and generating at its terminals a capacitance which varies with the approach of the hand M in the proximity of said electrode; when the variation of the capacitance has reached a threshold, the approach detection sensor to which the unlocking electrode is connected triggers the transmission of an unlocking request signal toward the microcontroller 40, an optical emitter, located on the door 20, which generates a light ray toward a receiver located on the handle 10; the approach of the hand main M to the handle 10 cuts this light ray, and the receiver then causes an unlocking request signal to be transmitted toward the microcontroller 40, a piezoelectric cell, which triggers an unlocking request signal when it undergoes mechanical deformation due to the mechanical force of the user's hand M which grasps the handle 10, an inductive sensor, which triggers an unlocking request signal when a target is approached by mechanical deformation of the handle (when the handle is grasped by the user's hand M), a mechanical microswitch, which generates an unlocking request signal when the deformation of the handle 10 (when the handle is grasped by the user's hand M) closes the contact of the switch.

These various unlocking presence detection devices 50 are known to persons skilled in the art, and will not be explained in detail herein. They can be used to detect the approach of a hand to the unlocking area of the handle 10 or the contact of the hand with this area, and to trigger an unlocking request signal to the microcontroller 40 when the user's hand M is placed on the unlocking area of the handle M. This unlocking request signal may take the form of a signal peak (see E1 in FIG. 5a), but other forms are possible, according to the unlocking presence detection device 50 used: reaching a maximum or minimum value, or the presence of a plateau, may signify the unlocking request. In FIG. 5a, the rise of the signal S above a threshold S1 (at point E1) during a first predetermined period t1 signifies that the unlocking request is validated.

The capacitive sensor 30, for its part, measures the variations of capacitance across the terminals of the locking electrode 60.

Figure 1:
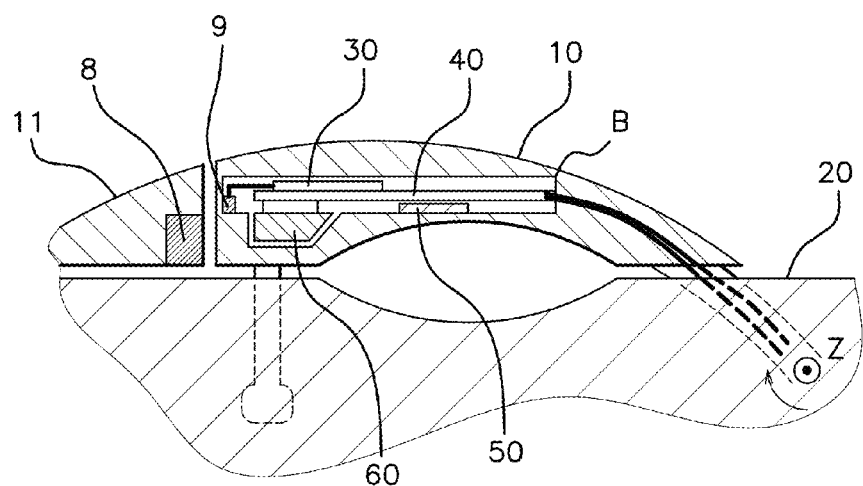
FIG. 1, explained above, is a schematic view of a handle 10 of a vehicle door 20 according to the prior art, in the rest state, comprising a Hall effect sensor 9 for detecting the actuation of the handle 10, FIG. 2, explained above, is a schematic view of a handle 10 of a vehicle door 20 according to the prior art, which has been actuated, that is to say pulled by a user, comprising a Hall effect sensor 9.
Figure 2:
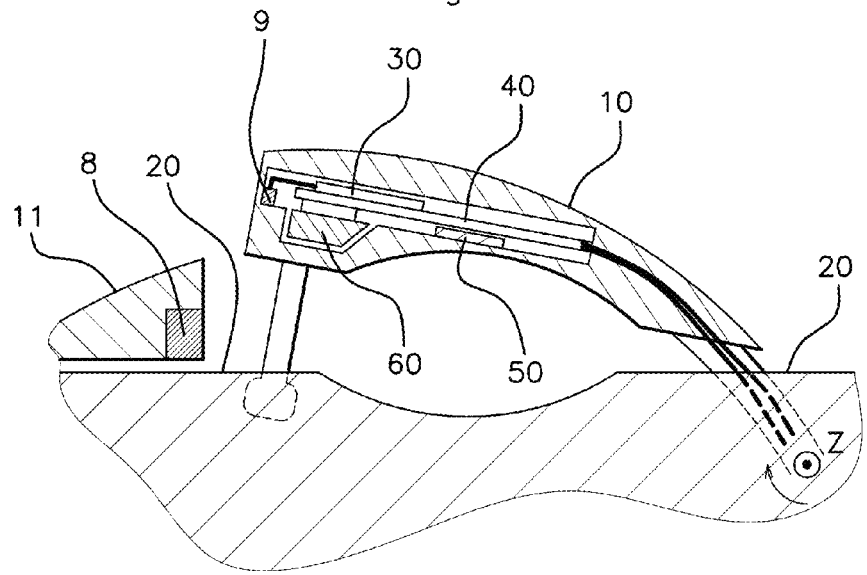
Figure 3:
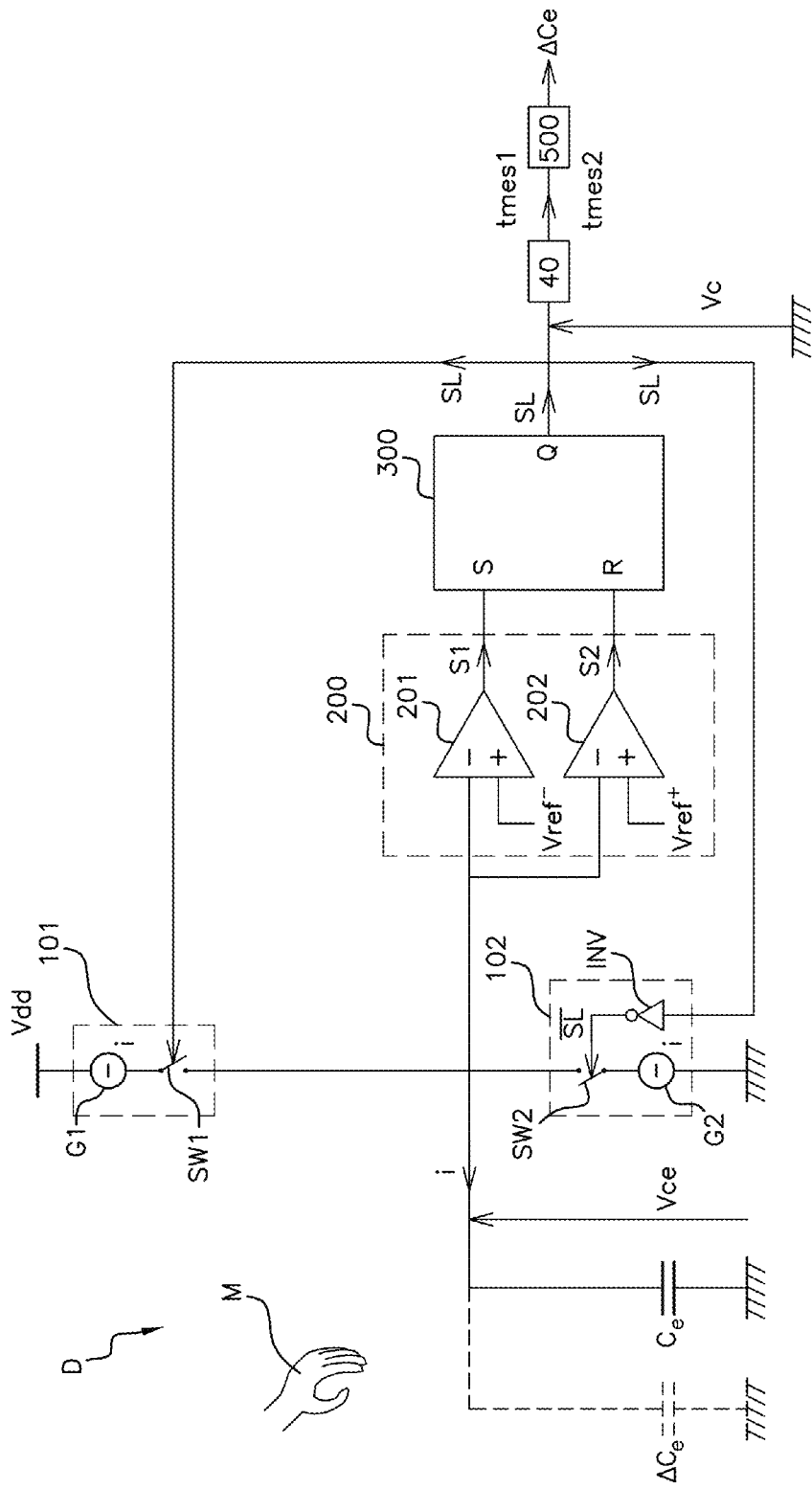
FIG. 3 shows, according to the prior art, a device D for measuring the variation of the capacitance Ce of an electrode.
Figure 4:
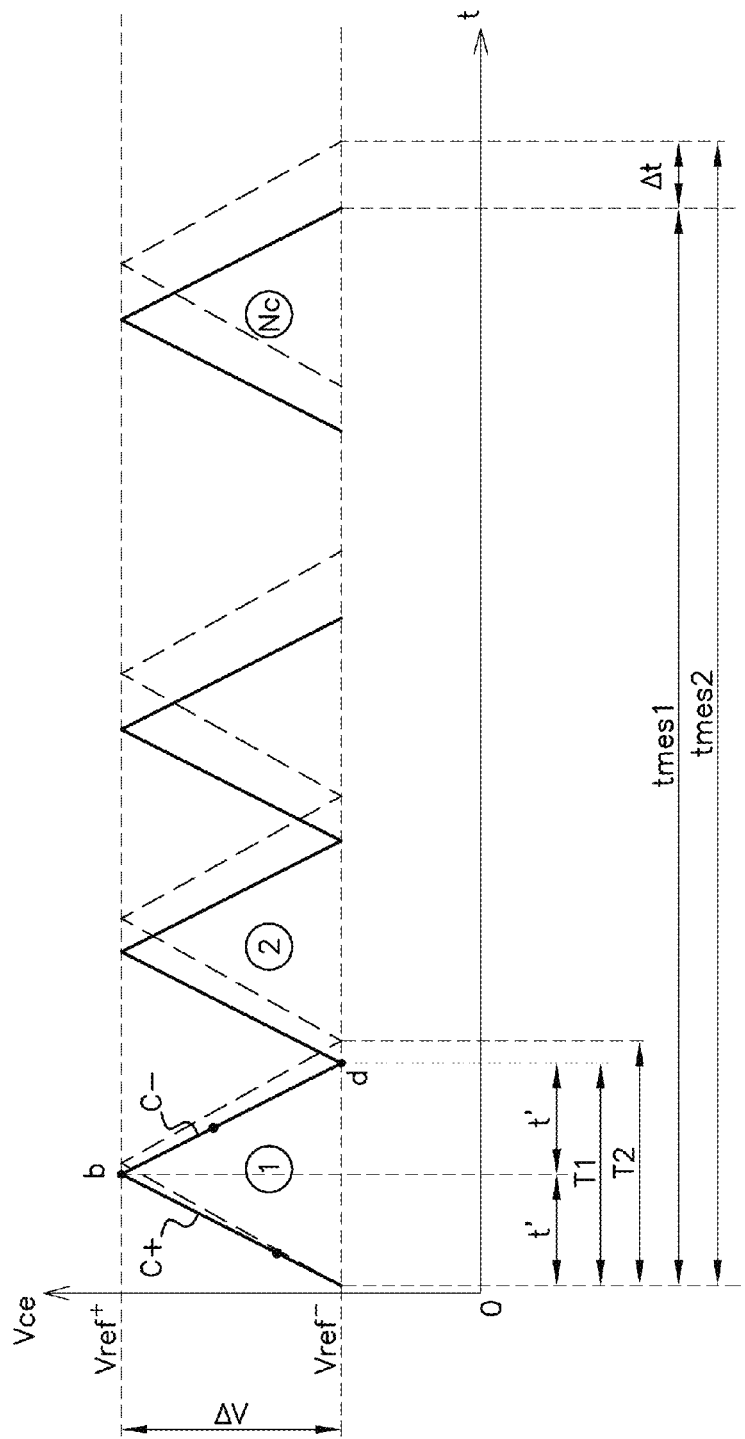
FIG. 4 shows, as a function of time t, the variation of the voltage Vice across the terminals of the capacitance Ce during the charge cycle C+ and the discharging cycle C−, according to the prior art device shown in FIG. 3.

The measurement principle is known to persons skilled in the art and is illustrated in FIGS. 3 and 4. In this case, the measurement principle is applied to the locking electrode 60. Purely for the purposes of explanation, the measurement principle is generalized to the measurement of the variation $\Delta C_e$ of a capacitance Ce of an electrode integrated into a handle 10 of a door 20.

When the user's hand M approaches the handle 10 of the door 20, that is to say when the user approaches the electrode, in FIG. 3, the capacitance $C_e$ of the electrode integrated into the handle increases by a value $\Delta C_e$. This variation $\Delta C_e$ of the capacitance Ce relative to the value of the capacitance Ce in the absence of a perturbing element such as the hand M or part of the user's body is measured with the aid of a measuring device D, integrated into the capacitive sensor 30. If the value of the variation $\Delta C_e$ passes through a threshold, this results in the validation of the detection of the presence of the hand M near the handle 10 of the door 20. In fact, this means that the user's hand M is sufficiently close to the handle 10 or is placed on said handle 10, and that the user is requesting access to the vehicle.

According to the prior art, the device D for measuring the variation of the capacitance Ce shown in FIG. 3 comprises:
a supply voltage Vdd,
a capacitance Ce, generally in the form of an electrode, having a voltage Vice across its terminals,
means for charging 101 and discharging 102 the capacitance Ce, these means performing a predetermined number Nc of cycles of charging and discharging the capacitance Ce,
comparison means 200, in the form of two comparators:
   a first comparator 201, comparing the voltage Vce across the terminals of the capacitance Ce with a first reference value Vref$^-$, and
   a second comparator 202, comparing the voltage Vce across the terminals of the capacitance Ce with a second reference value Vref$^+$,
means 300 of controlling the charge means 101 and discharge means 102, which activate the charge means 101 and the discharge means 102 charging and discharging the capacitance Ce on the basis of the result of the comparisons made by the comparison means 200 (201, 202) and according to a logic detailed below,
a counter 400 which measures the period t which the measurement device D requires in order to execute a predetermined number Nc of cycles of charging and discharging the capacitance Ce,
calculation means 500, which calculate a time variation Δt between the period tmes2 measured at the instant t and a previously measured period tmes1, Δt=tmes2−tmes1, the time variation Δt being representative of the variation ΔCe of the capacitance Ce at the instant t.

The capacitance Ce is then charged and discharged by the charge means 101 and the discharge means 102 according to a predetermined number Nc of charge and discharge cycles.

The voltage Vce across the terminals of the capacitance Ce varies according to the state of the first switch SW1 and that of the second switch SW2, that is to say according to whether the capacitance Ce is being charged or discharged.

This voltage Vce is compared with a first reference value Vref$^-$ and with a second reference value Vref$^+$, by the first and second comparators 201 and 202 respectively. A value of a first output S1 of the first comparator 201 is dependent on the result of the comparison with the first reference value Vref$^-$.

Similarly, a value of a second output S2 of the second comparator 202 is dependent on the result of the comparison with the second reference value Vref$^+$.

The first and second outputs S1 and S2 are connected to the input of the control means 300. These control means 300 are typically, according to the prior art, a logic circuit of the synchronous latch type, also called an "SR latch". The control means 300 activate the charge means 101 or the discharge means 102, or more precisely the first switch SW1 and the second switch SW2, as a function of the values received at the R and S inputs, in order to discharge or charge the capacitance Ce.

The charge and discharge cycles of the capacitance Ce are shown in FIG. 4. FIG. 4 shows, as a function of time t, the variation of the voltage Vce across the terminals of the capacitance Ce during the charge cycle C+ and the discharge cycle C− of the capacitance Ce. As shown in FIG. 4, the voltage Vce therefore oscillates between the first reference value Vref$^-$, and the second reference value Vref$^+$.

According to the prior art:

$$T1 = 2 \times t' = \frac{2 \times Ce \times (Vref^+ - Vref^-)}{i} \quad \text{Equation (1)}$$

where:
T1: period of a charge and discharge cycle (s)
t': period of a charge or a discharge (s)
Ce: value of the capacitance Ce (F)
Vref$^+$: second reference value (V)
Vref$^-$: first reference value (V)
i: absolute value of the charge or discharge current (A)

A counter 400 measures the period tmes1 which the measurement device D requires in order to execute this predetermined number Nc of charge and discharge cycles. Let equation (2) be:

$$tmes1 = Nc \times T1$$

The period tmes1 is reproducible and characteristic of the absence of disturbance of the sensor, that is to say, for example, the absence of a hand M.

When the user brings his hand M toward the handle 10, the capacitance Ce also increases by a value ΔCe (see FIG. 3). This variation of capacitance ΔCe has the effect of increasing the charge and discharge cycle time, and the new period of a cycle T2 (see FIG. 4, curve in broken lines), when the hand M is present, is longer than the period of the cycle T1 without the presence of the hand M. Consequently there is a new, longer period tmes2 for performing the same predetermined number Nc of cycles (see FIG. 4) when the hand M is present near the capacitive sensor.

The difference between the new period tmes2 and the previously measured period tmes1 is representative of the variation ΔCe of the capacitance Ce due to the presence of the hand M. According to the prior art, the variation ΔCe is given by the following equation (3):

$$\Delta Ce = \frac{(tmes2 - tmes1) \times i}{2 \times (Vref^+ - Vref^-) \times Nc}$$

Then, according to equation (2):

$$tmes1 = Nc \times T1$$

We also have:

$$tmes2 = Nc \times T2$$

where:
ΔCe: variation of the capacitance Ce (F)
tmes2: period (with the hand M present) required to execute a predetermined number Nc of charge and discharge cycles (s)
tmes1: period (without the hand M present) required to execute a predetermined number Nc of charge and discharge cycles (s)
Vref$^+$: second reference value (V)
Vref$^-$: first reference value (V)
i: absolute value of the charge or discharge current (A)
Nc: predetermined number of charge and discharge cycles
We therefore obtain the following equation (4):

$$\Delta Ce = \frac{(T2 - T1) \times i}{2 \times (Vref^+ - Vref^-)}$$

T1: period of a charge and discharge cycle (without a hand M present) (s)
T2: new period of a charge and discharge cycle (with a hand M present) (s)

This variation $\Delta Ce$ increases as the hand M approaches. When it exceeds a threshold, the detection of the user's presence is validated. The same applies to any object approaching the locking electrode 60. Conversely, when the hand M or an object moves away from the locking electrode 60, the variation $\Delta Ce$ decreases; this fact is exploited in the invention and explained below.

The locking electrode 60 is designed and positioned in such a way that it is insensitive to the user's intention of unlocking; in other words, there is no variation of the capacitance $\Delta C_V$ (of the locking electrode) when the user's hand M is on the handle 10, in the proximity of the unlocking presence detection device 50.

This is because the locking method is executed by the detection of the approach and/or contact of the user's hand M near the locking electrode 60. The locking electrode 60 is positioned in the handle 10 in such a way that its area of detection of the presence of the user's hand M, that is to say the locking area, is separate from the unlocking area of the unlocking presence detection device 50.

The invention is based on the following observations: the locking electrode 60 is located in the proximity of the door 20 and the counter-grip 11, which are metal parts. The presence of these metal parts in the immediate environment of the locking electrode 60 affects the value of the capacitance $C_V$ across the terminals of said locking electrode 60.

When the user's hand M is placed on the handle 10, the unlocking presence detection device 50 transmits a signal representative of an unlocking request, and then, when the user pulls the handle 10, the movement of the handle 10 away from the door 20 (starting at the instant P in FIG. 5a) causes the locking electrode 60 also to move away from the door 20 and/or the counter-grip 11, thereby creating a reduction in the variation of the capacitance $\Delta C_V$ of the locking electrode 60 relative to its value when the handle 10 is in the non-actuated rest position.

This reduction in the variation of the capacitance $\Delta C_V$ of the locking electrode 60 reaches a minimum when the handle 10 is pulled to its farthest extent, then remains substantially constant while the handle 10 is in the pulled position at a maximum distance from the door 20.

The invention proposes to use the unlocking request signal and the variations of the capacitance of the locking electrode 60 observed during the movement of the handle 10 in order to detect that the handle has been actuated, notably by making use of the parasitic effect of the position of the door 20 on the locking electrode 60.

According to the detection method of the invention, the decrease of the variation of the capacitance $\Delta C_V$ of the locking electrode 60 below a threshold S2 following the unlocking request (that is to say, as shown in FIG. 5a, when the unlocking request signal S reaches a threshold S1 during a first predetermined period t1) signifies the actuation of the handle 10. The word "following" here signifies that the capacitance $\Delta C_V$ of the locking electrode 60 decreases below a threshold S2 after a predetermined duration t1' starting from the instant P, that is to say once the hand M has been placed on the handle 10, in other words once the unlocking presence detection device 50 has transmitted a signal S signifying an unlocking request. In the example shown in FIG. 5a, when the signal S rises above a threshold S1, during a first predetermined period t1, the user is considered to be requesting the unlocking of his vehicle.

The locking electrode 60 and the unlocking presence detection device 50 may be sensitive to external disturbances such as the impact of rain or snow on the handle 10. These disturbances create variations of the capacitance $\Delta C_D$, as well as variations of the unlocking request signal S which may give rise to false detections.

In order to improve the reliability of the detection method according to the invention, the detection of an unlocking request (in the example, the rise of the unlocking request signal S above a threshold S1) and the decrease of the variation of the capacitance $\Delta C_V$ below a threshold S2 must be confirmed over a predetermined period (t1, t2; see FIGS. 5a and 5b) which is long enough to avoid taking into account any unwanted short-term variations of the capacitance $\Delta C_V$ and of the unlocking request signal due to external disturbances.

The method for detecting the actuation of the handle 10 according to the invention therefore comprises the following steps:
Step 1: continuously measuring the unlocking request signal and the variation of the first capacitance $\Delta C_V$ of the locking electrode 60,
Step 2: if, during a first predetermined period t1, the unlocking request signal is representative of an unlocking request, and if, during a second predetermined period t2, following the first predetermined period t1 (for example, within the predetermined duration t1' starting at the instant P), the variation of the capacitance $\Delta C_V$ is below a threshold S2, then
Step 3: detection of the actuation of the handle 10 is validated; otherwise,
Step 4: repetition of steps 1 to 3.

In a preferred embodiment of the invention, in step 2, the second predetermined period t2 starts within a predetermined duration t1', after the first predetermined period t1, that is to say once the first predetermined period t1 has elapsed (see FIG. 5).

When released, the handle 10 returns toward the door 20 and its rest position, with the aid of a return mechanism, for example with the aid of springs (not shown). During the return movement of the handle 10 toward the door 20 (instant R in FIG. 5b), the variation of the capacitance $\Delta C_V$ of the locking electrode 60 rises back to its initial value $\Delta C_{VT}$, that is to say the value of variation of the capacitance $\Delta C_V$ when the handle 10 is at rest near the door 10. The variation of the capacitance $\Delta C_V$ then rises again above the second threshold S2.

In a second embodiment of the invention, the detection method comprises a supplementary step (step 2b) of detecting the rise of the variation of the capacitance $\Delta C_V$ above the threshold S2 during a third predetermined period t3, in order to detect that the return movement of the handle 10 toward the door 20 has taken place, and therefore that the handle 10 has really been actuated.

This supplementary step improves the reliability of the detection of the actuation of the handle 10.

In a third embodiment of the invention, the second and third predetermined periods t2, t3 are included in a predetermined time interval $\Delta T$ (step 2b'). This predetermined time interval $\Delta T$ (see FIG. 5b) represents a standard out-and-back movement time of the handle 10 when it is actuated by the user.

This third embodiment further improves the reliability of detection against false detections due to external disturbances.

For example:
t1 is equal to 30 ms,
t2 is equal to 100 ms,
t3 is equal to 30 ms,
ΔT is in the range from 200 ms to 5000 ms,
t1' is in the range from 30 ms to 500 ms.

In a preferred embodiment of the method according to the invention, the unlocking presence detection device 50 comprises an unlocking electrode (not shown) which has a second capacitance across its terminals and is connected electrically to the approach detection sensor 30. The capacitive sensor 30 measures the variations of capacitance across the terminals of the two electrodes, namely the locking electrode 60 and the unlocking electrode. In this preferred embodiment, the method for detecting the actuation of the handle 10 according to the invention is based on the use of the variation of capacitance across the terminals of the electrodes present in the handle 10 when the handle is actuated. According to the invention, the decrease of the variation of the capacitance $\Delta C_V$ of the locking electrode 60 below the threshold S2 following the rise of the second capacitance of the unlocking electrode above a second threshold signifies the actuation of the handle 10.

The principle of measuring the variation of the second capacitance of the unlocking electrode is identical to the principle of measuring the variation of the capacitance of the locking electrode 60 which was explained above. The approach of the hand M in the proximity of the unlocking electrode causes a rise in the variation of the second capacitance of the locking electrode. When this variation exceeds a second threshold, the unlocking request is considered to be validated, and the signal from the unlocking electrode is considered to be representative of an unlocking request.

When the door 20 has been opened and the handle 10 has been released by the user (instant R in FIG. 5a), the variation of the second capacitance of the unlocking electrode decreases back toward an initial value, that is to say the value of variation of the second capacitance when the user's hand M is not in the proximity of the unlocking electrode.

In this preferred embodiment of the method according to the invention:
in Step 1, the continuous measurement of the unlocking request signal S consists in the continuous measurement of the variation of the second capacitance of the unlocking electrode,
In Step 2, the unlocking request signal S representative of an unlocking request consists in the rise of the variation of the second capacitance of the unlocking electrode above a second threshold.

To enable the detection method according to the invention to be executed, the handle 10 of the door 20 comprises:
means for continuously measuring the unlocking request signal and the variation of the first capacitance $\Delta C_V$,
means for determining the unlocking request on the basis of the unlocking request signal, and means for comparing the variation of the capacitance $\Delta C_V$ with a threshold S1,
a clock for measuring the first predetermined period t1, the second predetermined period t2, the third predetermined period t3, the predetermined time interval ΔT, and the predetermined duration t1',
means for detecting the actuation of the handle 10 on the basis of the result of the comparisons and the clock measurements.

The comparison means, the clock and the detection means are, for example, software means integrated into the microcontroller 40'.

Thus the invention can be used to detect the actuation of the vehicle door handle, using components already present in the handle, namely a locking electrode and an unlocking electrode, and dispensing with the use of a dedicated sensor.

The invention is applicable to the detection of any openable body sections of a vehicle, for example the opening of the trunk of a vehicle.

The invention is particularly advantageous because the detection method is reliable and inexpensive.

The invention claimed is:

1. A method for detecting the actuation of a handle of a motor vehicle door, said handle including an unlocking presence detection device generating an unlocking request signal, a locking electrode having a capacitance across terminals thereof, an approach detection sensor connected to the locking electrode, and a microcontroller connected electrically to the approach detection sensor and to the unlocking presence detection device, said method comprising the following steps:
   Step 1: continuously measuring the unlocking request signal and a variation of the capacitance;
   Step 2: determining, during a first predetermined period, whether or not the unlocking request signal is representative of an unlocking request, and determining, during a second predetermined period following the first predetermined period, whether or not the variation of the capacitance is below a threshold;
   Step 3: detecting the actuation of the handle when the unlocking request signal is determined to be representative of the unlocking request during the first predetermined period and the variation of the capacitance is determined to be below the threshold during the second predetermined period; and
   Step 4: repeating Steps 1 and 2 when one or more of the unlocking request signal is not determined to be representative of the unlocking request during the first predetermined period, and the variation of the capacitance is not determined to be below the threshold during the second predetermined period.

2. The detection method as claimed in claim 1, further comprising, between step 2 and step 3, the following step:
   Step 2b: determining, during a third predetermined period following the second predetermined period, whether or not the variation of the capacitance is above the threshold.

3. The detection method as claimed in claim 2, wherein the third predetermined period is equal to 30 ms.

4. The detection method as claimed in claim 2, wherein the unlocking presence detection device comprises an unlocking electrode which has a second capacitance across terminals thereof and is connected electrically to the approach detection sensor, and
   in Step 1, the continuous measurement of the unlocking request signal includes the continuous measurement of the variation of the second capacitance,
   in Step 2, the unlocking request signal representative of an unlocking request includes the rise of the variation of the second capacitance above a second threshold.

5. The detection method as claimed in claim 2, wherein the first predetermined period is equal to 30 ms and the second predetermined period is equal to 100 ms.

6. The detection method as claimed in claim 2, wherein the second predetermined period starts within a predetermined duration after the first predetermined period has elapsed, and is in the range from 30 ms to 500 ms.

7. The detection method as claimed in claim 1, further comprising, between step 2 and step 3, the following step:
   Step 2b': determining, during a third predetermined period following the second predetermined period, whether or not the variation of the capacitance is above the threshold, and the second predetermined period and the third predetermined period are included within a predetermined time interval.

8. The detection method as claimed in claim 7, wherein the predetermined time interval is in the range from 200 ms to 5000 ms.

9. The detection method as claimed in claim 7, wherein the unlocking presence detection device comprises an unlocking electrode which has a second capacitance across terminals thereof and is connected electrically to the approach detection sensor, and
   in Step 1, the continuous measurement of the unlocking request signal includes the continuous measurement of the variation of the second capacitance,
   in Step 2, the unlocking request signal representative of an unlocking request includes the rise of the variation of the second capacitance above a second threshold.

10. The detection method as claimed in claim 7, wherein the first predetermined period is equal to 30 ms and the second predetermined period is equal to 100 ms.

11. The detection method as claimed in claim 7, wherein the third predetermined period is equal to 30 ms.

12. The detection method as claimed in claim 7, wherein the second predetermined period starts within a predetermined duration after the first predetermined period has elapsed, and is in the range from 30 ms to 500 ms.

13. The detection method as claimed in claim 1, wherein the unlocking presence detection device comprises an unlocking electrode which has a second capacitance across terminals thereof and is connected electrically to the approach detection sensor, and
   in Step 1, the continuous measurement of the unlocking request signal includes the continuous measurement of the variation of the second capacitance,
   in Step 2, the unlocking request signal representative of an unlocking request includes the rise of the variation of the second capacitance above a second threshold.

14. The detection method as claimed in claim 13, wherein the first predetermined period is equal to 30 ms and the second predetermined period is equal to 100 ms.

15. The detection method as claimed in claim 13, wherein the third predetermined period is equal to 30 ms.

16. The detection method as claimed in claim 13, wherein the second predetermined period starts within a predetermined duration after the first predetermined period has elapsed, and is in the range from 30 ms to 500 ms.

17. The detection method as claimed in claim 1, wherein the first predetermined period is equal to 30 ms and the second predetermined period is equal to 100 ms.

18. The detection method as claimed in claim 1, wherein the second predetermined period starts within a predetermined duration after the first predetermined period has elapsed, and is in the range from 30 ms to 500 ms.

19. A motor vehicle configured to use the detection method as claimed in claim 1.

* * * * *